United States Patent [19]

Tangorra et al.

[11] 4,321,049
[45] Mar. 23, 1982

[54] POWER TRANSMISSION BELT

[75] Inventors: Giorgio Tangorra, Monza; Giulio Cappa, Milan, both of Italy

[73] Assignee: Industrie Pirelli S.p.A., Milan, Italy

[21] Appl. No.: 7,172

[22] Filed: Jan. 29, 1979

[30] Foreign Application Priority Data

Feb. 7, 1978 [IT] Italy ............................ 20042 A/78

[51] Int. Cl.³ ........................... F16G 5/08; F16G 5/10
[52] U.S. Cl. ................................... 474/242; 474/252; 474/265
[58] Field of Search .................. 74/234, 237, 231 CB, 74/231 P, 231 C, 233; 474/242, 252, 265, 270

[56] References Cited

U.S. PATENT DOCUMENTS

| 1,530,774 | 3/1925 | Kepler | 474/252 |
| 1,982,869 | 12/1934 | Heyer | 74/233 |
| 2,189,049 | 2/1940 | Ungar | 74/233 |
| 2,430,024 | 11/1947 | Luaces et al. | 74/237 |
| 2,690,985 | 10/1954 | Poole | 74/237 X |
| 2,775,902 | 1/1957 | Rush | 74/234 |
| 3,402,616 | 9/1968 | Prior | 74/233 |
| 3,656,360 | 4/1972 | Fix | 74/234 |
| 3,949,621 | 4/1976 | Beusink et al. | 74/234 X |
| 3,968,703 | 7/1976 | Bellmann | 74/233 X |
| 4,108,012 | 8/1978 | Warner et al. | 74/231 C |
| 4,151,755 | 5/1979 | Allaben | 74/231 P |

FOREIGN PATENT DOCUMENTS

| 2821698 | 11/1978 | Fed. Rep. of Germany | 74/234 |
| 1176766 | 11/1958 | France . | |
| 1296039 | 11/1972 | United Kingdom | 74/231 C |

Primary Examiner—C. J. Husar
Assistant Examiner—Conrad Berman
Attorney, Agent, or Firm—Stevens, Davis, Miller & Mosher

[57] ABSTRACT

An elastomeric or plastomeric power transmission belt is reinforced with longitudinally extending wires or threads which are flexible and substantially inextensible. Longitudinally uniformly spaced rigid members which are embedded cross-wise in the belt with one surface adjacent to the longitudinally extending reinforcing members support the wires or threads during vulcanization or curing of the elastomer or plastomer and resist transversal deformation of the belt during use.

5 Claims, 5 Drawing Figures

U.S. Patent           Mar. 23, 1982           4,321,049
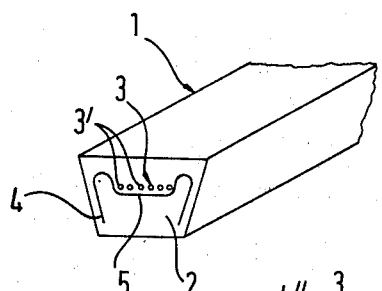
FIG.1
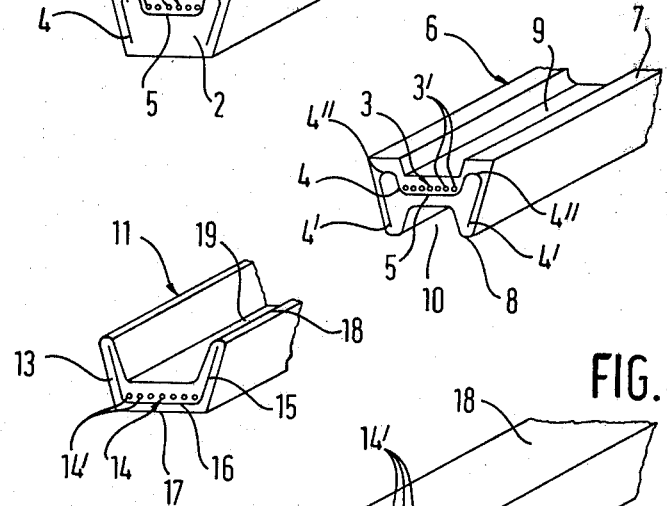
FIG.2
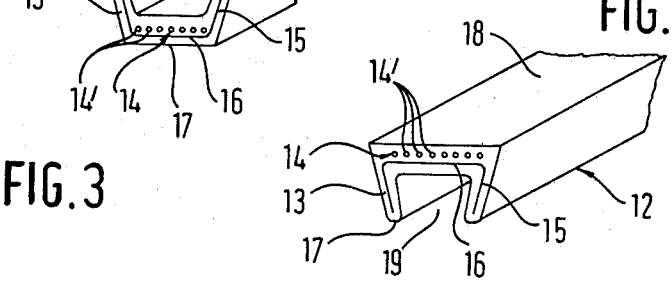
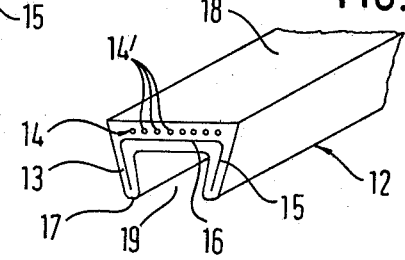
FIG.3      FIG.4
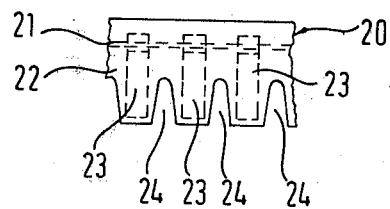
FIG.5

POWER TRANSMISSION BELT

The present invention relates to a power transmission belt and, in particular, to a V-belt adapted for use in speed variators.

Power transmission belts having a V-shaped cross-section for transmitting mechanical power are known. These known belts have an elastomeric body reinforced with a longitudinally extending resistant insert member of a plurality of small threads of a flexible and inextensible material. The threads all lie in the same plane and are parallel to one another. These known belts may or may not have a covering of rubberized fabric which resists wear. The prior art belts have several disadvantages, one of which is that they have low yield in transmitting power from one pulley to another.

As a matter of fact, a good part of the power transmitted by the known V-belts is dissipated by the belts due to hysteresis losses that the elastomeric material has because of repeated deformations as it rotates around the pulleys. Moreover, such belts absorb large amounts of power because of the inertia due to their heavy construction. Also, the known belts are not sufficiently rigid transversely to prevent transversal deformations. As a consequence of this, in addition to not being capable of guaranteeing a constant transmission ratio as time passes, the transverse deformation results in "sliding" of the belt in the pulley groove which reduces the efficiency of the power transmission. Moreover, such transversal deformation results in additional absorption of power and causes overheating of the belt body which reduces its resistance to fatigue.

An object of the present invention is to overcome the above-described drawbacks of the V-belts, and in particular, to provide a belt having a V-shaped cross-section for transmitting mechanical power which efficiently transmits power at a constant transmission ratio as time passes and has a longer life-time than the prior art V-belts.

Another object of the invention is to provide a power transmission belt having a V-shaped cross-section capable of transmitting greater power over a lifetime at least as long as the lifetime of the prior art V-shaped belts.

Other objects will become apparent from the following description with reference to the accompanying drawing wherein FIG. 1 is a fragmentary perspective view of one embodiment of the invention;

FIG. 2 is a fragmentary perspective view of a second embodiment of the invention;

FIGS. 3 and 4 are fragmentary perspective views of other embodiments of the invention; and FIG. 5 is a fragmentary elevation of still another embodiment of the invention.

The foregoing objects and others are accomplished in accordance with the invention by providing a power-transmission belt having an elastomeric or plastomeric body of a V-shaped cross-section, a plurality of elongated tension resistant members embedded in and extending longitudinally through the body and disposed coplanar and substantially parallel to one another, and, also embedded in the belt body, substantially uniformly longitudinally spaced rigid members disposed across the width of the body which resist transversal deformation of the belt body and have one surface thereof supporting the elongated longitudinally extending insert members whereby the elongated longitudinally extending insert members are supported during the vulcanization or curing of the belt and the belt body already vulcanized is made resistant to transverse deformation during use. The longitudinally extending insert members may be wires or flexible and substantially inextensible threads.

Thus, in its broadest aspects, the invention contemplates broadly a belt for power transmission having an elastomeric or plastomeric body of V-shaped cross-section, an insert member formed by a plurality of threads of a flexible but inextensible material which are coplanar and parallel to one another and resist tensioning of the belt, and a plurality of transverse rigid insert members which are embedded and distributed at substantially regular intervals along the entire development of the belt body with one surface of each of the rigid insert members being in contact with the longitudinally extending reinforcing members. The longitudinally extending insert members are flexible but substantially inextensible.

One surface of each of the rigid insert members is disposed in contact with the longitudinally extending insert members. The surface of the rigid insert members which is in contact with the longitudinally extending insert member is disposed transversely across the width of the belt and preferably lies in correspondence of the thrust-center for the longitudinal tangential forces acting upon the side-edges of the belt. The thrust-center for the longitudinal tangential forces acting upon the side-edges of the belt is the particular place where the sum total of all the longitudinal tangential forces resulting from engagement of the belt with the pulley is applied. As is the case for practically all known V-belts, also for the belt according to the invention, the elongated longitudinally extending insert member is positioned near the neutral axis in all sections that are perpendicular to the greater dimension of the belt.

In FIG. 1, a belt 1 having a V-shaped cross-section has an elastomeric body 2 in which is embedded an insert member 3 formed of a plurality of threads 3' which are coplanar and parallel to one another. Threads 3' are of a flexible and inextensible material such as, for example, steel, nylon, glass-fibers, polyamide or aramide, polyester, rayon or the like. In the body 2 of elastomeric or plastomeric material moreover, are embedded, according to the present invention, a plurality of rigid members 4, each having a "H" form, and distributed at substantially regular intervals along the entire length of the V-belt 1. The transverse tracts 5 of members 4 are in contact with the threads 3' of the resistant insert member 3. The contact takes place on the upper part of the transverse tracts 5 (as shown in FIG. 1) or else in the lower part of the transverse tracts 5.

Reinforcing members 4 are metal. Alternatively, members 4 may be any other rigid material capable of resisting without deformation the temperature required for vulcanizing the belt 1.

FIG. 2 shows another embodiment of a V-belt 6, according to the present invention. V-belt 6 is quite similar in its internal structure, to the V-belt 1 illustrated in FIG. 1.

The sole difference is that a longitudinally extending continuous groove 9 is provided in the major base 7 and a similar groove 10 is provided in the minor base 8.

In other embodiments of the belt only one of grooves 9 and 10 may be provided.

In other embodiments of the invention which are not illustrated in the drawing, the insert members 4 are placed upsidedown in belts like 1 and 6 of FIGS. 1 and 2 so that the free extremities 4' are near the major base 7, of the V-belt.

Modifications of the belts of FIGS. 1 and 2 are illustrated in FIGS. 3 and 4. These two modifications are distinguished from those of FIGS. 1 and 2 by their height, i.e. the distance between the major and the minor bases is reduced.

For the V-belts of FIGS. 3 and 4, the transverse tract traced by the insert members 4 (the form of which shall be described later on, in more detail), practically lies in correspondence with the thrust-center of the longitudinal transverse forces previously defined. Because, the height of the V-belts is reduced, the difference between the theoretical position (i.e. the position in correspondence with the thrust-center of the longitudinal tangential forces), and the effective position, is negligible.

Even in the case of these V-belts, the resistant insert member 3 lies along the neutral axis of the belt.

In FIGS. 3 and 4, two V-belts 11 and 12, respectively, are shown in cross-section and in perspective. Belts 11 and 12 have a body 13 of elastomeric or plastomeric material and a resistant insert member 14 formed by a plurality of threads 14' coplanar and parallel to one another embedded in body 13. Threads 14' are nylon. They may be of any of the other materials listed for belt 1 of FIG. 1. The transverse reinforcing members 15 embedded and distributed at substantially equal intervals in elastomeric body 13 having an U-shaped form are of metal or other rigid material mentioned before in the description of the belt in FIG. 1. In particular in the V-belt 11 of FIG. 3, members 15 are disposed with their transverse tracts 16 along the minor base 17 of V-belt 11, while the larger base 18 contains a continuous longitudinal groove 19. On V-belt 12 (represented in FIG. 4) on the other hand, members 15 are disposed with their transverse tracts 16 along the larger base 18 of V-belt 12, while the smaller base 17 contains the continuous longitudinal groove 19.

According to another embodiment of the invention, a belt (not illustrated) having the same characteristics of the belts 11 and 12 (represented respectively in the FIGS. 3 and 4) differs from belts 11 and 12 only by being devoid of a continuous longitudinal groove 19.

In both of the embodiments illustrated in FIGS. 3 and 4, the transverse tract 16 of the members 15 is in contact with the threads 14' of the longitudinal resistant insert member 14, along the upper surface of the transverse tract 16. As an alternative, the transverse tracts 16 of members 15 are in contact with the threads 14', along the lower surface of the transverse tract 16.

In FIG. 5, a length of another embodiment of a V-belt 20 is illustrated in a side elevation. V-belt 20 has a resistant insert member 21 and reinforcing members 23 embedded in the body 22 of elastomeric or plastomeric material. In particular, the resistant member 21 are in contact with the part of the reinforcing members 23 that are parallel to the bases of the V-belt.

The V-belt 20 has moreover, transverse incisions 24 which extend from the smaller base substantially up to the resistant insert members 21 without, however, touching it. Transverse incisions 24 are regularly interposed with the members 23 that are embedded in the body 22 (as is clearly shown in said FIG. 5). However, (although not represented in FIG. 5) there may also be present in the body 22 of the V-belt 20, instead of the transverse incisions 24 or along with them, other transverse incisions that are similar to the transverse incisions 24, which however, depart from the larger base and extend substantially up to the resistant insert member 21, without however, touching it. The form of the incisions 24 present in the body of the belt of FIG. 5 is not critical. Such incisions may be of any other geometrical form provided that the desired form does not interfere with either the resistant insert members 21 or the members 23. The transverse incisions 24 can be present in any of the embodiments of the invention.

The power transmission belts provided by the invention may or may not be covered either totally or just partially such as, for instance, only on the working surface, with one or more layers of conventional protective covering material.

The covering may be, for example, two layers of a rubberized fabric whose wefts and warps are crossed one with respect to the other, and, in particular, a fabric in which the wefts and warps are inclined at an angle of 45° with respect to the longitudinal symmetrical plane of the belt. However, since the wefts and warps of each layer are inclined towards opposite sides, the wefts and warps of the two layers of rubberized fabrics are substantially perpendicular to each other.

Moreover, solely by way of example, the belt body may be made of elastomeric material having the following composition. Such a belt body maintains its rubber-metal connection even during fatigue operations.

| Natural rubber | 100 parts by weight |
| large particle carbon-black | from 50–100 parts by weight |
| zinc-oxide | 5 parts by weight |
| stearic acid | 2 parts by weight |
| sulphur | 2.5 parts by weight |
| accelerators | 1 to 2 parts by weight |
| anti-ageing | 1 to 2 parts by weight |

It is apparent that the objects of the invention are achieved. In fact, the V-belts provided by the present invention have substantial transverse rigidity that allows them to transmit substantial power, with a constant transmission ratio as time passes, because the rigid members embedded in the V-belts prevent any reduction in the cross-section of the belt and as a consequence impede wedging of the belt in the pulley grooves, as normally occurs in the known V-belts. Moreover, the V-belts provided by the present invention are considerably lighter in weight both because of the presence of the longitudinal grooves and of the presence of the transverse incisions. But the reduction in weight alone is not the main reason for the greater efficiency in power transmissions. The amount of power absorbed by the belt because of hysteresis losses caused by deformation as the belts traverse the pulley is greatly reduced by the reduction in elastomeric material because of the longitudinal grooves and where the transverse incisions are present. This reduction in the energy absorbed and dissipated through the hysteresis losses causes the total power transmitted by the V-belt of the invention to be higher than the power transmitted with the heretofore available V-belt. This helps the yield of power transmission to be higher than with a V-belt of the known type. Moreover, the employment of individual rigid transverse reinforcing members separated from one another provides greater longitudinal flexibility when compared to that of the known V-belts. Finally, since the threads of the longitudinal resistant insert member are in contact with the horizontal transverse tract of the spaced insert members the threads of the longitudinal insert remain aligned and coplanar and parallel to one another during manufacture and use exactly in their predetermined position, i.e. with respect to the neutral axis of the belt.

As a direct consequence of the improvements with which the V-belts, according to the present invention, are furnished, it results that the belts can transmit greater power if their lifetime remains the same as that of known V-belts, or if the power transmitted is the same as that of known V-belts, the V-belts according to the present invention have a longer lifetime.

In addition to the particular forms described and represented in the drawing for the longitudinally spaced insert members, it is to be understood that members of other shapes may be used provided that they are appropriate to the mechanical purpose so as to guarantee both the transverse rigidity of the V-belt and a suitable supporting surface for the threads of the resistant insert.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A belt for association with a pulley for power transmission comprising an elastomeric or plastomeric body member having a first base, a second base smaller transversally than said first base and two converging straight side edges which extend between said bases, a continuous longitudinal groove in one of said bases of said body member, a tension resisting insert member of spaced, parallel, coplanar, non-woven, inextensible wires or threads embedded in said body member parallel to said bases, a plurality of transverse, longitudinally spaced rigid members having a constant thickness and two dimensions predominant with respect to the third and extending integrally with a first portion along a first side edge of the belt adjacent and parallel thereto and extending the entire length thereof, with a second portion along a base of the belt parallel and adjacent thereto and with a third portion along a second side edge of the belt adjacent and parallel thereto and extending the entire length thereof, said first portion being connected to said second and third portions, respectively by a ninety degree loop, said transverse rigid members being fully embedded and distributed at substantially equal intervals along the length of the belt, said transverse rigid members having said second portion contacting the tension resisting insert member.

2. A belt for association with a pulley for power transmission comprising an elastomeric or plastomeric body member having a first base, a second base smaller transversally than said first base and two converging straight side edges which extend between said bases, a tension resisting insert member of spaced, parallel, coplanar, inextensible wires or threads embedded in said body member parallel to said bases, a plurality of transverse, longitudinally spaced rigid members having a constant thickness and two dimensions predominant with respect to the third and extending in a continuous manner with a first portion along a first side edge of the belt adjacent and parallel thereto and extending the entire length thereof, a second portion along a base of the belt parallel and adjacent thereto and a third portion along a second side edge of the belt adjacent and parallel thereto and extending the entire length thereof, said second portion being connected to said first and third portions, respectively by a first substantially ninety degree loop followed by a second substantially one hundred and eighty degree loop, said transverse rigid members being fully embedded and distributed at substantially equal intervals along the length of the belt and having said second portion contacting the tension resisting insert member.

3. The belt of claim 2 wherein at least one of said bases has a continuous longitudinal groove therein.

4. A V-belt for power transmission comprising an elastomeric or plastomeric body having a first base, a second base which is smaller transversally than the first base, and two converging straight side edges between the said bases, a tension resisting insert member of spaced parallel, coplanar, inextensible wires or threads fully embedded in said body parallel to said bases, a plurality of transverse longitudinally spaced rigid members fully embedded and distributed at substantially equal intervals along the length of said belt, said transverse rigid members having a first surface contacting the tension resisting insert member and two lateral surfaces parallel and adjacent to the side edges of the belt and extending the entire length thereof, said first surface being joined to said two lateral surfaces by a first substantially ninety degree loop followed by a second substantially one hundred and eighty degree loop.

5. The V-belt for power transmission of claim 4 wherein at least one of said bases has a continuous longitudinal groove therein.

* * * * *